United States Patent [19]

Asano et al.

[11] Patent Number: 4,641,075
[45] Date of Patent: Feb. 3, 1987

[54] METHOD OF AND APPARATUS FOR CONTROLLING CURRENT OF INVERTER

[75] Inventors: Katsuhiro Asano, Toyoake; Yukio Inaguma, Nagoya; Norio Iwama, Ama, all of Japan

[73] Assignee: Kabushiki Kaisha Toyota Chuo Kenkyusho, Aichi, Japan

[21] Appl. No.: 608,247

[22] Filed: May 8, 1984

[30] Foreign Application Priority Data

May 19, 1983 [JP] Japan .................................. 58-087962

[51] Int. Cl.$^4$ ............................................ H02P 5/40
[52] U.S. Cl. ........................................ 318/811; 363/42
[58] Field of Search ........................ 318/803, 807–811; 363/41, 42

[56] References Cited

U.S. PATENT DOCUMENTS

| 4,028,600 | 6/1977 | Blaschke et al. | 318/803 |
| 4,459,534 | 7/1984 | Nagase et al. | 318/811 |
| 4,481,457 | 11/1984 | Zach et al. | 318/811 |

Primary Examiner—David Smith, Jr.
Attorney, Agent, or Firm—Parkhurst & Oliff

[57] ABSTRACT

An inverter current controlling method wherein output currents of an inverter having a plurality of switching elements and connected to a three-phase load are detected, and the switching elements are ON/OFF controlled so that the waveforms of the output currents are approximated to set output current wave commands, respectively, comprising: maintaining a specific switching element in a specific state so that a specific output terminal of the inverter is fixed to a specific polarity during a period of time when a specific ideal phase voltage of the three-phase load corresponding to the output current wave command is in a predetermined phase; and ON/OFF controlling the switching elements other than the specific switching element during the period of the predetermined phase so that the output current waveforms are approximated to the output current wave commands, respectively. Also disclosed is an inverter current controlling apparatus suitably employed in the above-mentioned method.

18 Claims, 20 Drawing Figures

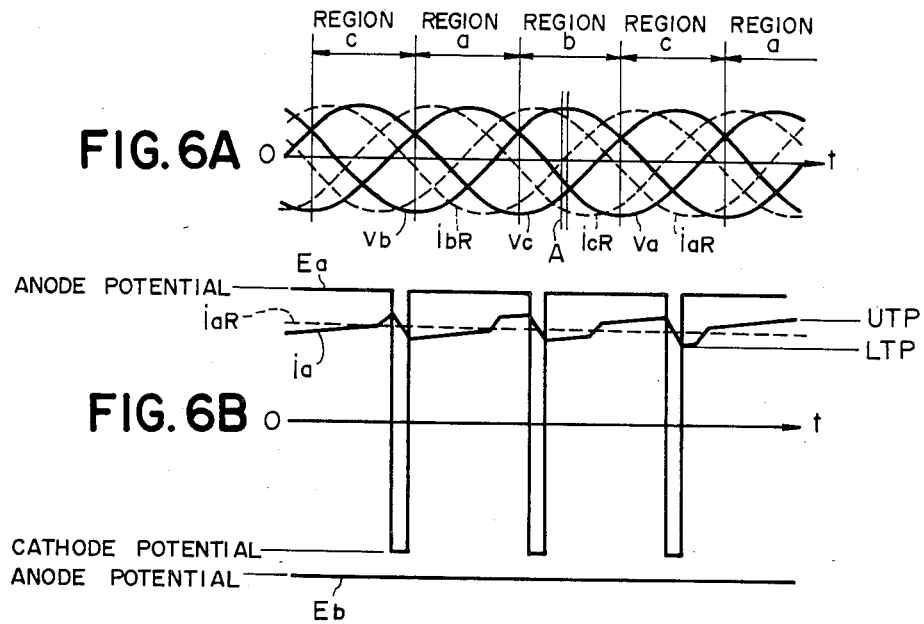
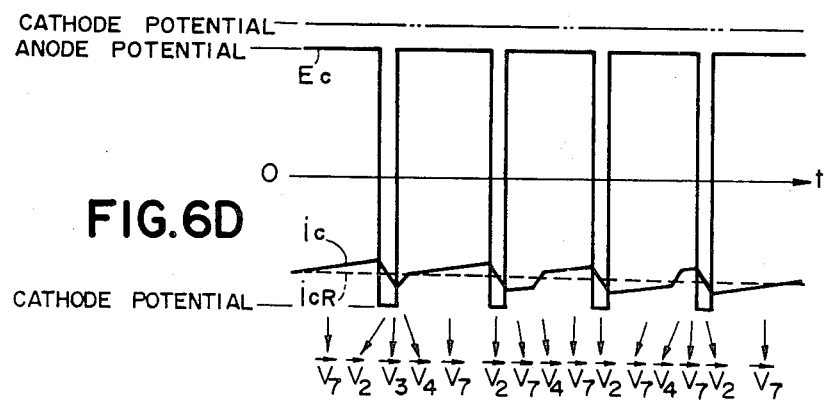

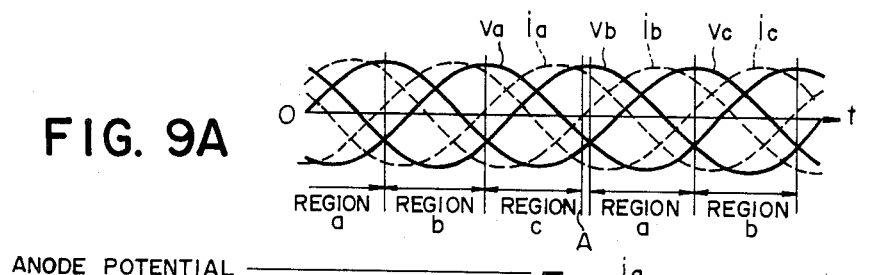
FIG. 9A
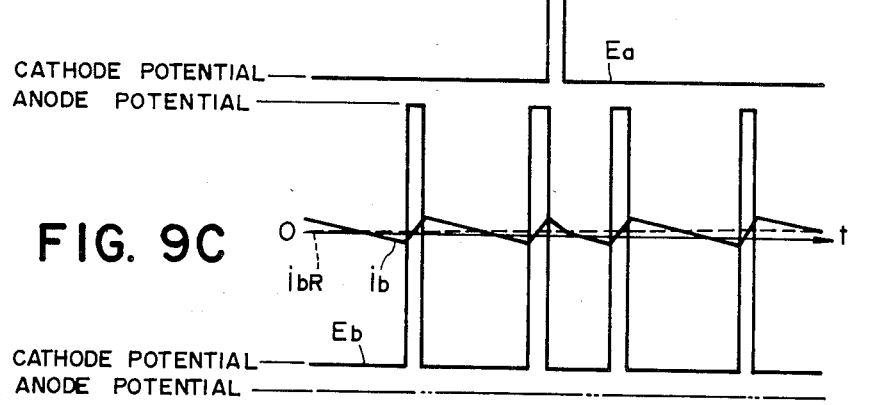
FIG. 9B
FIG. 9C
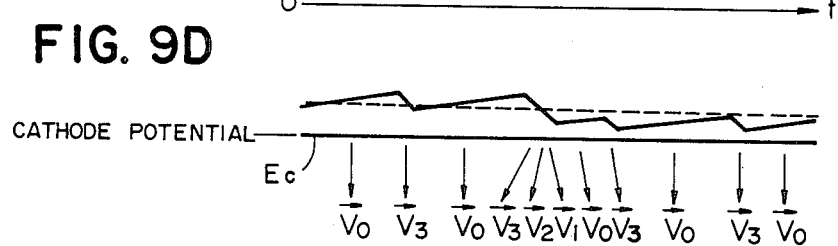
FIG. 9D

METHOD OF AND APPARATUS FOR CONTROLLING CURRENT OF INVERTER

BACKGROUND OF THE INVENTION

1. Field of the Invention

The present invention relates to a method of and apparatus for controlling current of an inverter, and more particularly, to a method of and apparatus for controlling current of the inverter in which output currents of the inverter connected to a three-phase load are detected, and control is effected so that instantaneous values of the output currents are substantially equal to set output current command values, respectively.

2. Description of the Prior Art

FIG. 1 shows a conventional apparatus for controlling a current-controlled three-phase inverter which feeds back output currents of the inverter to effect current control so that instantaneous values of the output currents are substantially equal to output current command values, respectively. A three-phase inverter 1 includes switching elements 1a, 1b, 1c connected to a DC power source in parallel. Output terminals a, b, c of the switching elements are connected through wires to the respective phases of a Y-connected three-phase load 2. Further, each of the wires is connected with a current detector 3 for detecting instantaneous values of output currents $i_a$, $i_b$, $i_c$ delivered from the switching elements, respectively. The current detector 3 is connected to a current detection circuit 4 for changing output signals from the current detector 3 into signal levels suitable for use in current control circuits 6, 7, 8, respectively. A calculating circuit 5, which calculates output current command values $i_{aR}$, $i_{bR}$, $i_{cR}$ for the respective output currents of the switching elements, is connected to the current control circuits 6, 7, 8 for ON/OFF controlling the switching elements independently of one another. The current control circuits 6, 7, 8 are fed with the output currents $i_a$, $i_b$, $i_c$ from the current detection circuit 4, and are connected to the switching elements, respectively.

As shown in FIG. 2, each of the current control circuits 6, 7, 8 is constituted by a series circuit composed of a comparator 9 for making a comparison between an output current command value and the instantaneous value of an output current, an amplifier 10 with hysteresis and a driver 11.

In the inverter current controlling apparatus arranged as above, the switching elements are ON/OFF controlled by feedback control so that the output currents of the switching elements are substantially equal to the output current command values, respectively. Since the switching elements are switched to the anode or cathode of the DC power source through the ON/OFF control, there are eight combinations in polarity of the output terminals a, b, c of the inverter as shown in Table 1 below.

TABLE 1

| Output terminal | Voltage vector | | | | | | | |
|---|---|---|---|---|---|---|---|---|
| | $V_0$ | $V_1$ | $V_2$ | $V_3$ | $V_4$ | $V_5$ | $V_6$ | $V_7$ |
| a | − | + | + | − | − | − | + | + |
| b | − | − | + | + | + | − | − | + |
| c | − | − | − | − | + | + | + | + |

Accordingly, the phase voltage or phase potential applied to the load 2 is constituted by eight kinds of voltage vectors $V_0$ to $V_7$, shown in Table 1 and FIG. 3, which are made temporally continuous.

FIG. 4A shows waveforms of the output current command values $i_{aR}$, $i_{bR}$, $i_{cR}$ and those of ideal phase voltage $v_a$, $v_b$, $v_c$ applied to the load when currents completely coincident with the respective current command values are delivered from the inverter. The waveforms of the ideal phase voltages are out-of-phase with respect to those of the respective output current command values due to the impedance of the load. Further, FIGS. 4A to 4D are enlarged views of the part A of FIG. 4A which is divided into three so as to be shown in these Figures, respectively. FIG. 4B shows the waveforms of a potential $E_a$ at the output terminal a of the switching element 1a, the output current $i_a$ and the output current command value $i_{aR}$, while FIG. 4C shows the waveforms of a potential $E_b$ at the output terminal b of the switching element 1b the output current $i_b$ and the current command value $i_{bR}$. In addition, FIG. 4D shows the waveforms of a potential $E_c$ at the output terminal c of the switching element 1c, the output current $i_c$ and the current command value $i_{cR}$. Referring to FIG. 4B, when the output current $i_a$ exceeds a upper-limit UTP in the case of rising of the current, the switching element 1a is turned OFF and connected to the cathode of the DC power source; when the output current $i_a$ is less than a lower-limit LTP in the case of decaying of the current, the switching element 1a is turned ON and connected to the anode of the DC power source. This ON/OFF control causes the potential $E_a$ at the output terminal a to change in the form of pulse. On the other hand, when the switching element 1a is ON or OFF, the other switching elements are turned ON or OFF; hence, the output current $i_a$ stepwisely changes as shown in FIG. 4B. In addition, the voltage vectors applied to the load when the switching elements are thus controlled, are constituted by voltage vectors in six directions, that is, $V_4$, $V_5$, $V_6$, $V_1$, $V_2$, $V_3$ which are made temporally continuous.

As described above, in the conventional inverter current controlling apparatus, the potentials at the output terminals a, b, c of the switching elements are selected independently of one another. Therefore, the voltage vectors in six directions are freely selected with respect to all of periods. In consequence, the output current waveform includes an exceedingly large amount of ripple, resulting in the production of strident noises in the operation of the inverter as well as an increase of electro-magnetic wave, which causes a noise to an electronic circuit, disadvantageously. Further, since the number of required ON/OFF operations of the inverter, that is, the number of commutating operations thereof required for effecting current control is increased, the switching elements consituted by semiconductors or the like increase in switching loss, resulting in a reduction in conversion efficiency of the inverter and an increase in the inverter capacity, disadvantageously. Moreover, when the load is an electric motor, since the voltage vectors in six directions are selected with respect to all of periods as described above, there is a period during which voltage vectors in the direction opposite to an ideal magnetic flux rotation direction are undesirably selected. In consequence, the magnetic flux continuously repeats normal rotation, reverse rotation and stop, so that the locus of the magnetic flux unfavorably draws a wastefully curved loop and includes many vibrations. As a result, the iron loss is increased, and the electric motor is further reduced in efficiency, disadvantageously. In addition, when the load is an electric motor, there is a problem of increase in torque pulsation and copper loss due to the current ripple, in addition to the above-mentioned problems.

SUMMARY OF THE INVENTION

Accordingly, it is an object of the present invention to provide a method of controlling current of an inverter which makes it possible to reduce both the number of required commutating operations of the inverter and the amount of the current ripple, for decreasing noises and the inverter capacity and increasing the inverter conversion efficiency, by improving the method of determining the potential at each of output terminals of the inverter, thereby to solve the above-mentioned problems of the prior art.

It is another object of the present invention to provide an apparatus for controlling current of an inverter suitably employed in the above-mentioned method.

To these ends, according to a first aspect of the invention, there is provided an inverter current controlling method wherein output currents of an inverter having a plurality of switching elements and connected to a three-phase load are detected, and the switching elements are ON/OFF controlled so that the waveforms of the output currents are substantially equal to set output command values, respectively, comprising: maintaining a specific switching element in a specific state so that a specific output terminal of the inverter is fixed to a specific polarity during a period of time when a specific ideal phase voltage of the three-phase load corresponding to the output command value is in a predetermined phase angle; and ON/OFF controlling the other switching elements than the specific switching element at a plurality of times during the period of the predetermined phase angle so that the output current waveforms are substantially equal to the output command values, respectively.

Moreover, according to a second aspect of the invention, there is provided an inverter current controlling apparatus comprising: a current detection means for detecting instantaneous values of output currents of an inverter having a plurality of switching elements and connected to a three-phase load; a first calculating means for calculating output current command values corresponding to the output currents; a second calculating means for selecting a specific switching element for fixing a specific output terminal of the inverter to a specific polarity in accordance with an ideal phase voltages of the three-phase load corresponding to the output current command values, as well as calculating a phase angle for maintaining a specific switching element in a specific state; and a current control means for maintaining the selected specific switching element in a specific state during the period of the calculated phase angle, as well as making comparison between the instantaneous values of the output currents and the output current command values, respectively, during the period of the phase angle for maintaining a specific switching element in a specific state, to ON/OFF control the other switching elements than the specific switching element so that the instantaneous values of the output currents are substantially equal to the output current command values, respectively.

In this case, the ideal phase voltage means a phase voltage applied to a load phase when the output current waveform is made completely coincident with the corresponding current command waveform, i.e., when current with the current command waveform is allowed to flow through the load. The ideal phase voltage can easily be obtained if the impedance of the load is known, since the amplitude of the current command waveform changes to shift the phase in accordance with the impedance. Further, even when the impedance of the load is not known, the ideal phase voltage can be detected by passing through a filter an actual phase voltage being applied to the load. Moreover, the instantaneous values of the output currents $i_a$, $i_b$, $i_c$ constantly have therebetween the relationship represented by the following equation (1).

$$i_a + i_b + i_c = 0$$

Therefore, even when a specific switching element is maintained in either of the ON and OFF states, if the waveforms of two of the output currents are substantially equal to the current command waveforms by the ON/OFF control of the other switching elements, respectively, then the waveform of the other output current is also substantially equal to the corresponding current command waveform.

The present invention can employ the following three modes in selection of a specific switching element, a specific state in which the specific switching element is maintained, and a period during which the specific switching element is maintained in a specific state.

In a first mode, an output terminal of an inverter which delivers current to be made to flow into a load phase having an ideal phase voltage showing a positive maximum value is specified, and a specific switching element connected to the specified output terminal is maintained in a specific state so that the specified output terminal serves as an anode during a period of a phase angle not exceeding 120°, and during the same period of time the other switching elements than the specific switching element are ON/OFF controlled so that the output current waveforms are substantially equal to output command values, respectively.

In a second mode, an output terminal of the inverter which is fed with current to be made to flow out from a load phase having an ideal phase voltage showing a negative maximum value is specified, and a specific switching element connected to the specified output terminal is maintained in a specific state so that the specified output terminal serves as a cathode during a period of a phase angle not exceeding 120°, and during the same period of time the other switching elements are ON/OFF controlled so that the output current waveforms are substantially equal to output command values, respectively.

Finally, in a third mode, an output terminal of the inverter which delivers current to be made to flow into a load phase having an ideal phase voltage showing a positive maximum value is specified, and a specific switching element connected to the specified output terminal is maintained in a specific state so that the specified output terminal serves as an anode during a period of a phase angle not exceeding 60°, and during the same period of time the other switching elements are ON/OFF controlled so that the output current waveforms are substantially equal to output current wave commands, respectively. In addition, an output terminal of the inverter which is fed with current to be made to flow out from a load phase having an ideal phase voltage showing a negative maximum value is specified, and a specific switching element connected to the specified output terminal is maintained in a specific state so that the specified output terminal serves as a cathode during a period of a phase angle not exceeding 60°, and during the same period of time the other switching elements are ON/OFF controlled so that the output current waveforms are substantially equal to output command values, respectively.

According to the present invention, since a specific output terminal of the inverter is fixed to a specific polarity during the period of a predetermined phase angle, voltage vectors selected during the period of the predetermined phase angle are limited to four kinds of voltage vectors selected from Table 1. In consequence, the phase voltage applied to the load by ON/OFF controlling the other switching elements than a specific switching element is constituted by these four kinds of voltage vectors which are made temporally continuous. Accordingly, the number of required commutating operations of the inverter is reduced, so that the switching losses of the switching elements constituted by semiconductors or the like are decreased and it is possible to improve the inverter in conversion efficiency and reduce the inverter capacity. In addition, since the amount of ripple on the output current is reduced, the noises produced due to the ripple can be reduced as compared with the prior art, advantageously. Moreover, since four kinds of voltage vectors are selected which are suitable for constituting an ideal phase voltage and an ideal magnetic flux to be applied to the load, there is no possibility of selection of any voltage vectors in the opposite direction as in the case of the prior art. In consequence, when an electric motor is employed as the load, the magnetic flux has only the normal rotation and stop modes, so that the locus of the magnetic flux does not draw any wastefully curved loop. Thus, vibrations are decreased, and the amount of the ripple on the output current is reduced. Accordingly, it becomes possible to reduce the torque pulsation and the copper and iron losses, so that the electric motor is improved in efficiency, advantageously.

The above and other objects, features and advantages of the invention will become clear from the following description of the preferred embodiments thereof taken in conjunction with the accompanying drawings.

BRIEF DESCRIPTION OF THE DRAWINGS

FIG. 6A is a chart showing the relationship between output command values and ideal phase voltage waveforms in accordance with a first mode of the inverter current controlling method of the invention;

FIGS. 6B to 6D are enlarged views of the part A of FIG. 6A;

FIG. 9A is a chart showing the relationship between output command values and ideal phase voltage waveforms in accordance with a second mode of the inverter current controlling method of the invention;

FIGS. 9B to 9D are enlarged views of the part A of FIG. 9A;

DESCRIPTION OF THE PREFERRED EMBODIMENTS

The method of controlling current of an inverter according to the first aspect of the invention will be described hereinunder in detail.

The method of controlling current of an inverter can employ the following three modes in selection of a specific switching element, a specific state in which the specific switching element is maintained, and a period during which the specific switching element is maintained in a specific state.

In a first mode, an output terminal of an inverter which delivers current to be made to flow into a load phase having an ideal phase voltage showing a positive maximum value is specified, and a specific switching element connected to the specified output terminal is maintained in a specific state so that the specified output terminal serves as an anode during a period of a phase angle not exceeding 120°, and during the same period of time the other switching elements than the specific switching element are ON/OFF controlled so that the output current waveforms are substantially equal to output current wave commands, respectively.

In a second mode, an output terminal of the inverter which is fed with current to be made to flow out from a load phase having an ideal phase voltage showing a negative maximum value is specified, and a specific swithcing element connected to the specified output terminal is maintained in a specific state so that the specified output terminal serves as a cathode during a period of a phase angle not exceeding 120°, and during the same period of time the other switching elements are ON/OFF controlled so that the output current waveforms are substantially equal to output command values, respectively.

Finally, in a third mode, an output terminal of the inverter which delivers current to be made to flow into a load phase having an ideal phase voltage showing a positive maximum value is specified, and a specific switching element connected to the specified output terminal is maintained in a specific state so that the specified output terminal serves as an anode during a period of a phase angle not exceeding 60°, and during the same period of time the other switching elements are ON/OFF controlled so that the output current waveforms are substantially equal to output command values, respectively. In addition, an output terminal of the inverter which is fed with current to be made to flow out from a load phase having an ideal phase voltage showing a negative maximum value is specified, and a specific switching element connected to the specified output terminal is maintained in a specific state so that the specified output terminal serves as a cathode during a period of a phase angle not exceeding 60°, and during the same period of time the other switching elements are ON/OFF controlled so that the output current waveforms are substantially equal to output command values, respectively.

The first mode will be described hereinunder in more detail with reference to FIGS. 5 to 8.

Figure 7:
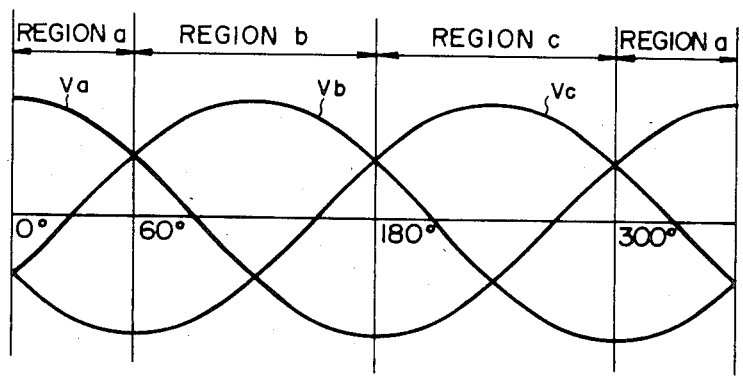
FIG. 7 is a chart showing the relationship between the ideal phase voltages and regions for fixing polarity in accordance with the first mode.

If output command values corresponding to switching elements $1a$, $1b$, $1c$ are set to be $i_{aR}$, $i_{bR}$, $i_{cR}$, respectively, as shown in FIG. 6A, the ideal phase voltages of the load corresponding to the current wave commands are $v_a$, $v_b$, $v_c$, respectively. The ideal phase voltages $v_a$, $v_b$, $v_c$ are maximum in 120° phase angle regions a, b, c, respectively, as shown in FIGS. 6A and 7. Accordingly, in the first mode: in the region a, the switching element $1a$ delivering current to be made to flow into a phase a of the load is maintained in the ON state during a period of a phase angle not exceeding 120°; in the region b, the switching element $1b$ delivering current to be made to flow into a phase b of the load is maintained in the ON state during a period of a phase angle not exceeding 120°; and in the region c, the switching element $1c$ delivering current to be made to flow into a phase c of the load is maintained in the ON state during a period of a phase angle not exceeding 120°.

Potentials $E_a$, $E_b$, $E_c$ at the output terminals a, b, c and output currents $i_a$, $i_b$, $i_c$ obtained when the switching element $1b$ is maintained in the ON state during a period of a phase angle of 120° in the region b will be explained hereinunder with reference to FIGS. 6B to 6D. FIGS. 6B to 6D are enlarged views of the part A of FIG. 6A which is divided into three so as to be shown in these Figures, respectively. Since the switching element $1b$ is maintained in the ON state, the potential $E_b$ at the output terminal b is coincident with the potential at the anode of the DC power source as shown in FIG. 6C. On the other hand, since the switching elements $1a$, $1c$ are ON/OFF controlled so that the waveforms of the output currents $i_a$, $i_c$ are substantially equal to those of the current command values $i_{aR}$, $i_{cR}$ similarly to the prior art, the potential $E_a$ at the output terminal a and the potential $E_c$ at the output terminal c change as shown in FIGS. 6B and 6D, respectively. As a result, the output current $i_b$ is controlled so as to be substantially equal to the current command value $i_{bR}$. In this case, since the switching element ib is maintained in the ON state, the voltage vectors applied to the load are limited to four kinds of vectors where the b-phase potential is equivalent to the anode potential in Table 1, so that the phase voltage applied to the load is constituted by the voltage vectors $V_7$, $V_2$, $V_3$, $V_4$ in the region b of FIG. 8 which are made temporally continuous. Similarly, in the region a where the switching element $1a$ is maintained in the ON state, the voltage vectors $V_7$, $V_6$, $V_1$ $V_2$ are selected, while in the region c where the switching element $1c$ is maintained in the ON state, the voltage vectors $V_7$, $V_4$, $V_5$, $V_6$ are selected.

Figure 8:
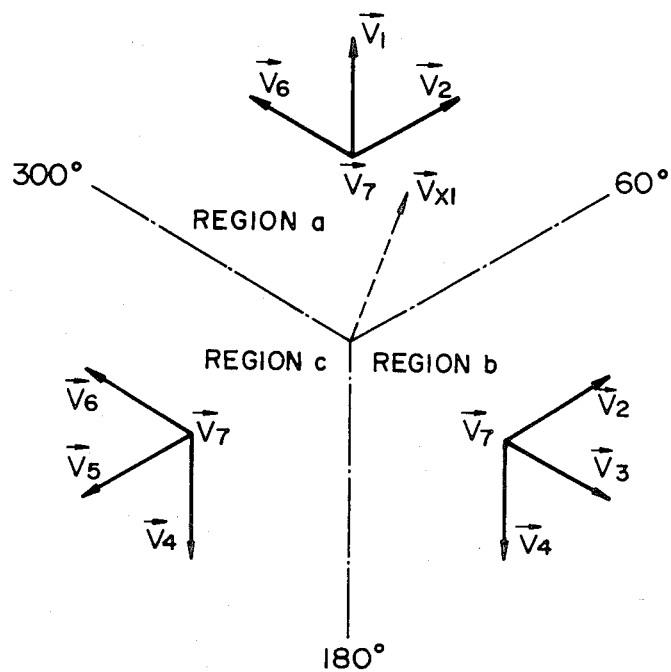
FIG. 8 is a chart showing voltage vectors in accordance with the first mode.

As described above, the output current waveforms in the first mode are smaller in the amount of ripple than those in the prior art shown in FIG. 4, and also the number of required switching operations of the switching elements is reduced. This is because the voltage vectors selected in each of three regions divided in accordance with the phases of the ideal phase voltages are limited to four kinds of voltage vectors suitable for constituting the phase voltage applied to the load in the region, as shown in FIG. 8. In this connection, assuming that a voltage required for effecting an ideal control of the phase current at a certain point of time is such a vector $V_{X1}$ as shown in FIG. 8, in the first mode only the voltage vectors $V_7$, $V_6$, $V_1$, $V_2$ are selected to constitute the vector $V_{X1}$ and a temporal mean value thereof is substantially equal to the vector $V_{X1}$, but the voltage vectors $V_3$, $V_4$, $V_5$ in the opposite direction which impair characteristics are not selected. In particular, when the load is an electric motor, the locus of the magnetic flux does not draw any wastefully curved loop and also the amount of ripple is reduced, since any voltage vectors impairing characteristics, that is, the voltage vectors in the direction opposite to the ideal magnetic flux rotation direction are not selected.

It is to be noted that if the phase angle during which a specific switching element is maintained in the ON state is made smaller than 120°, then it is possible to provide a deadband which prevents any switching element from being maintained in the ON state in the vicinity of each of the boundaries between the regions a, b, c. The provision of the deadband is effective in preventing any improper switching element from being maintained in the vicinity of a boundary due to errors produced in a control means or detection means.

As described above, according to the first mode, it is possible to easily realize the current control simply by dividing one period into three regions so that a specific ideal phase voltage corresponding to an output current wave command becomes maximum positive in each region, and maintaining a specific switching element delivering current to be made to flow into a load phase having an ideal phase voltage showing a positive maximum value, in the ON state in each region. Therefore, the control circuit will not be complicated, and characteristics are improved as mentioned above.

Next, the second mode will be explained hereinunder with reference to FIGS. 9 to 11.

Figure 10:
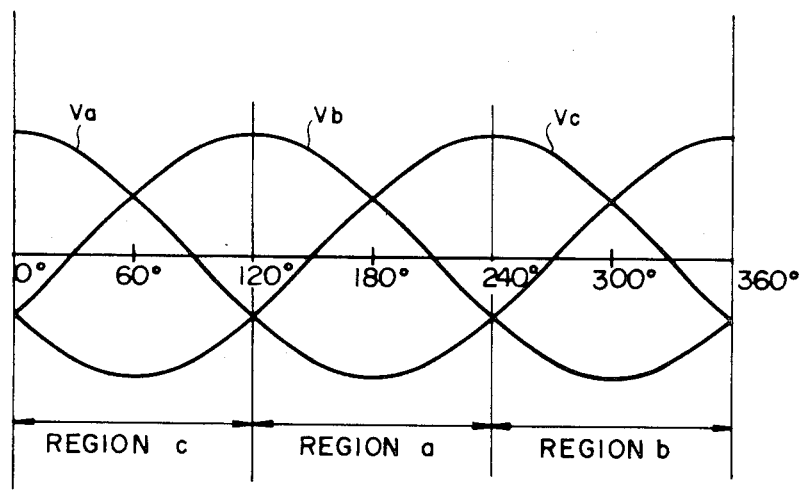
FIG. 10 is a chart showing the relationship between the ideal phase voltages and regions for fixing polarity in accordance with the second mode.
Figure 11:
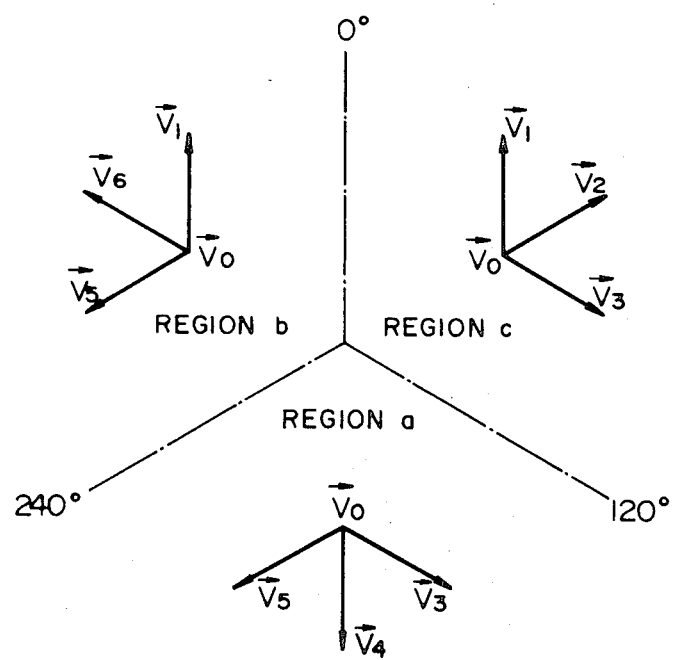
FIG. 11 is a chart showing voltage vectors in the second mode.

If the regions a, b, c are determined as shown in FIG. 10, the ieal phase voltages $v_a$, $v_b$, $v_c$ become negative maximum in the regions a, b, c, respectively. Accordingly, in the second mode: in the region a, the switching element $1a$ fed with current to be made to flow out from the phase a of the load is maintained in the OFF state during a period of a phase angle not exceeding 120°; in the region b, the switching element $1b$ fed with current to be made to flow out from the phase b of the load is maintained in the OFF state during a period of a phase angle not exceeding 120°; and in the region c, the switching element $1c$ fed with current to be made to flow out from the phase c of the load is maintained in the OFF state during a period of a phase angle not exceeding 120°.

FIGS. 9B to 9D show the waveforms of the potentials $E_a$, $E_b$, $E_c$ at the output terminals a, b, c and those of the output currents $i_a$, $i_b$, $i_c$ of the inverter obtained when the switching element $1c$ is maintained in the OFF state during a period of a phase angle of 120° in the region c and the switching elements $1a$, $1b$ are ON-/OFF controlled during the same period of time. It is to be noted that FIGS. 9B to 9D are enlarged views of the part A of FIG. 9A which is divided into three so as to be shown in these Figures, respectively. Further, four kinds of voltage vectors selected in each region are shown in FIG. 11.

In this mode, since the switching element $1a$ is maintained in the OFF state in the region a, the voltage vectors $V_0$, $V_3$, $V_4$, $V_5$ where the a-phase potential is equivalent to the cathode potential in Table 1 are selected in the region a. Similarly, in the region b where the switching element $1b$ is maintained in the OFF state, the voltage vectors $V_0$, $V_5$, $V_6$, $V_1$ are selected, while in the region c where the switching element $1c$ is maintained in the OFF state, the voltage vectors $V_0$, $V_1$, $V_2$, $V_3$ are selected.

According to the second mode, similarly to the first mode, the output current waveforms are made smaller in the amount of ripple than those in the prior art, and also the number of required switching operations of the switching elements can be reduced, advantageously. This is because, as shown in FIG. 11, the voltage vectors selected in each of the regions divided in accordance with the phases of the ideal phase voltages are limited to four kinds of voltage vectors suitable for constituting the phase voltage applied to the load in the region. Moreover, also when the load is an electric motor, similarly to the first mode, the locus of the magnetic flux does not draw any wastefully curved loop and also the amount of ripple is reduced, since any voltage vectors in the direction opposite to an ideal magnetic flux rotation direction are not selected.

It is to be noted that if the phase angle during which a specific switching element is maintained in the OFF state is made smaller than 120°, then it is possible to provide a deadband which prevents any switching element from being maintained in the OFF state in the vicinity of each of the boundaries between the regions a, b, c, similarly to the first mode.

The second mode is basically the same as the first mode and therefore offers similar advantageous effects.

Finally, the third mode will be explained hereinunder with reference to FIGS. 12 to 14.

Figure 13:
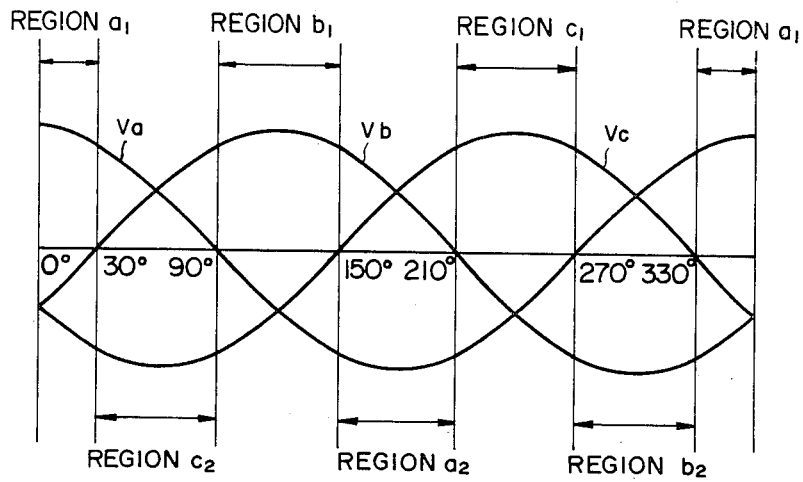
FIG. 13 is a chart showing the relationship between the ideal phase voltages and regions for fixing polarity in accordance with the third mode.
Figure 14:
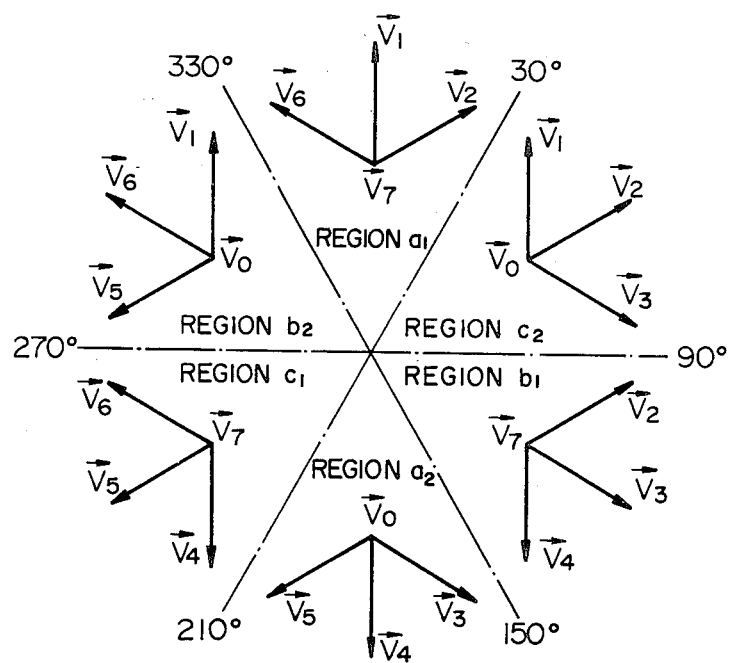
FIG. 14 is a chart showing voltage vectors in accordance with the third mode.

If regions $a_1$, $b_1$, $c_1$ and regions $a_2$, $b_2$, $c_2$ are determined as shown in FIG. 13, the ideal phase voltages $v_a$, $v_b$, $v_c$ become maximum positive in the regions $a_1$, $b_1$, $c_1$, respectively, while the ideal phase voltages $v_a$, $v_b$, $v_c$ become maximum negative in the regions $a_2$, $b_2$, $c_2$, respectively. Accordingly, in the third mode: in the region $a_1$, the switching element $1a$ delivering current to be made to flow into the phase a of the load is maintained in the ON state during a period of a phase angle not exceeding 60°; and in the region $a_2$, the switching element $1a$ fed with current to be made to flow out from the phase a of the load is maintained in the OFF state during a period of a phase angle not exceeding 60°. Similarly, in the region $b_1$, the switching element $1b$ is maintained in the ON state during a period of a phase angle not exceeding 60°; in the region $b_2$, the switching element $1b$ is maintained in the OFF state during a period of a phase angle not exceeding 60°; in the region $c_1$, the switching element $1c$ is maintained in the ON state during a period of a phase angle not exceeding 60°; and in the region $c_2$, the switching element $1c$ is maintained in the OFF state during a period of a phase angle not exceeding 60°.

Figure 12A:
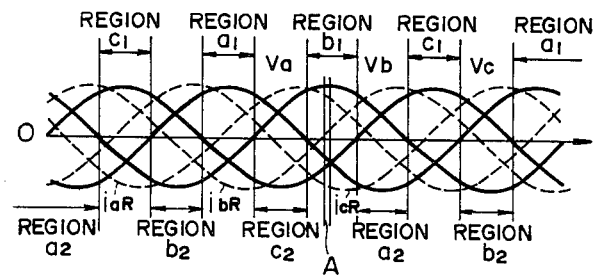
FIG. 12A is a chart showing the relationship between output command values and ideal phase voltage waveforms in accordance with a third mode of the inverter current controlling method of the invention.
Figure 12B:
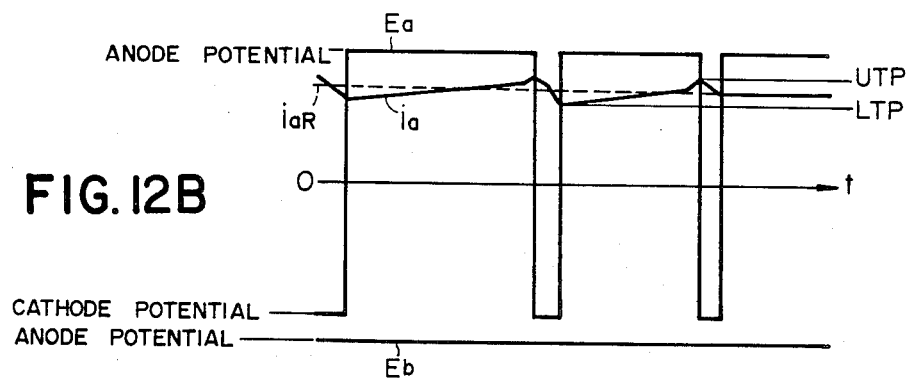
FIGS. 12B to 12D are enlarged views of the part A of FIG. 12A.
Figure 12C:
Figure 12D:
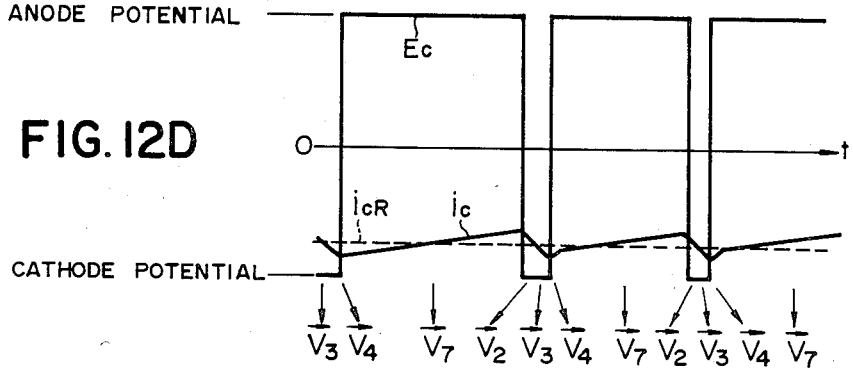

FIGS. 12B to 12D show the waveforms of the potentials $E_a$, $E_b$, $E_c$ at the output terminals a, b, c and those of the output currents $i_a$, $i_b$, $i_c$ of the inverter obtained when the switching element $1b$ is maintained in the ON state during a period of a phase angle of 60° in the region $b_1$ and the switching elements $1_a$, $1_c$ are ON/OFF controlled during the same period of time. It is to be noted that FIGS. 12B to 12D are enlarged views of the part A of FIG. 12A which is divided into three so as to be shown in these Figures, respectively. In addition, the voltage vectors selected in each region are shown in FIG. 14. Also in the third mode, four kinds of voltage vectors are selected in each region for the reasons mentioned in the description of the first and second modes.

According to the third mode, similarly to the first and second modes, the output current waveforms are made smaller in the amount of ripple than those in the prior art, and the number of required switching operations of the switching elements can be reduced, advantageously. This is because the voltage vectors selected in each of the six regions divided in accordance with the phases of the ideal phase voltages are limited to four kinds of voltage vectors suitable for constituting the phase voltage applied to the load in the region. Moreover, also when the load is an electric motor, similarly to the first and second modes, the locus of the magnetic flux does not draw any wastefully curved loop and also the amount of ripple is reduced, since any voltage vectors in the direction opposite to an ideal magnetic flux rotation direction are not selected.

According to the third mode, a specific switching element to be maintained and a specific state in which a specific switching element is maintained are changed every 60° to effect control so that only ideal voltage vectors are selected at all times. Therefore, the controllability is more improved as compared with the first and second modes, advantageously. Further, according to the third mode, even if the period of time during which a specific switching element is maintained in a specific state is out-of-phase by 30° due to errors produced in the control means or detection means, it is advantageously possible to be substantially equal to the output currents of the inverter to the current command values, respectively, by ON/OFF controlling the other switching elements, without any possibility of maintaining any improper switching element in a specific state. This is because if the phase is shifted by ±30° at maximum, it is within a phase angle during which a specific switching element is maintained in a specific state in the first or seond mode. It is to be noted that if the phase angle during which a specific switching element is maintained in a specific state is made smaller than 60°, then it is possible to provide a deadband which prevents any switching element from being maintained in a specific state in the vicinitity of each of the boundaries between the regions.

As described above, according to the inverter current controlling method of the invention, it is possible to reduce the amount of ripple on the output current; therefore, noises can be reduced. In addition, since the number of required switching operations of the inverter can be reduced, the switching loss is decreased, so that the inverter is improved in conversion efficiency and the inverter capacity can be reduced. Further, when an electric motor is employed as the load, the locus of the magnetic flux draws no wastefully curved loop but a smooth circle with reduced ripple; hence, iron and copper losses are decreased to improve the electric motor in efficiency, and the torque pulsation can be reduced.

It is to be noted that in FIGS. 6, 9 and 12 employed for the description of the first, second and third modes, the upper and lower limits UTP, LTP are set to be ½ of those in FIG. 4, respectively. In consequence, the amount of ripple and the number of required switching operations of the inverter are both reduced. If the upper and lower limits UTP, LTP in FIGS. 6, 9, 12 are made equal to those in FIG. 4, although the amount of the current ripple is equal to that in the prior art, the number of required switching operations of the inverter can be made smaller than those in FIGS. 6, 9, 12. To the contrary, if the upper and lower limits UTP, LTP in FIGS. 6, 9, 12 are set to be less than ½ of those in FIG. 4, respectively, so that the number of required switching operations of the inverter is substantially equal to that in the prior art, then it is possible to further reduce the amount of the current ripple as compared with those in FIGS. 6, 9, 12.

The inverter current controlling apparatus according to the second aspect of the invention will be described hereinunder with reference to FIGS. 15 to 20.

Figure 1:
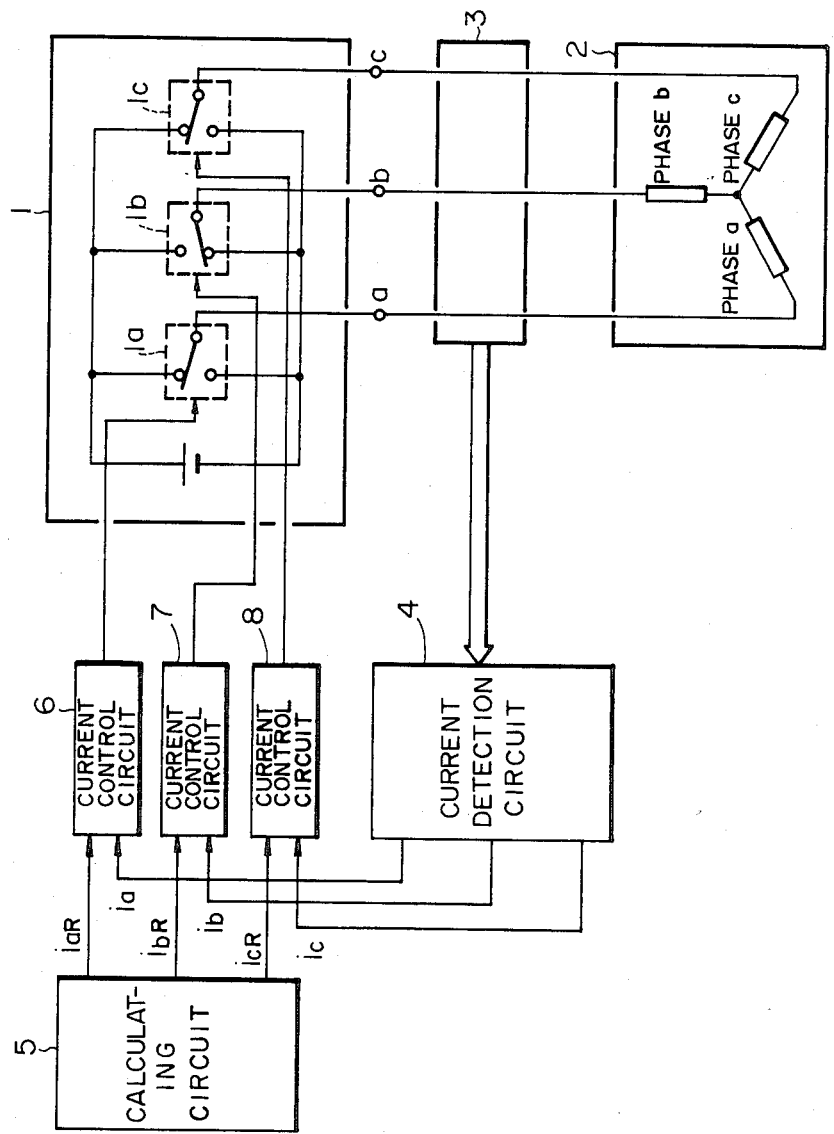
FIG. 1 is a circuit diagram of a conventional apparatus for controlling current of a current-controlled inverter.
Figure 2:
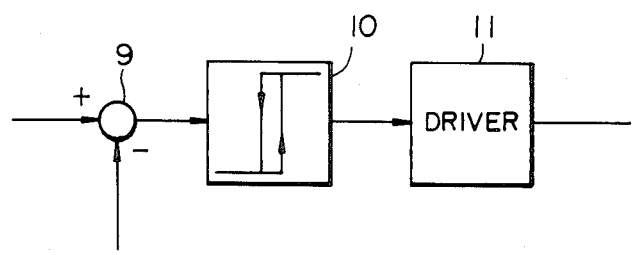
FIG. 2 is a circuit diagram of a current control circuit in FIG. 1.
Figure 3:
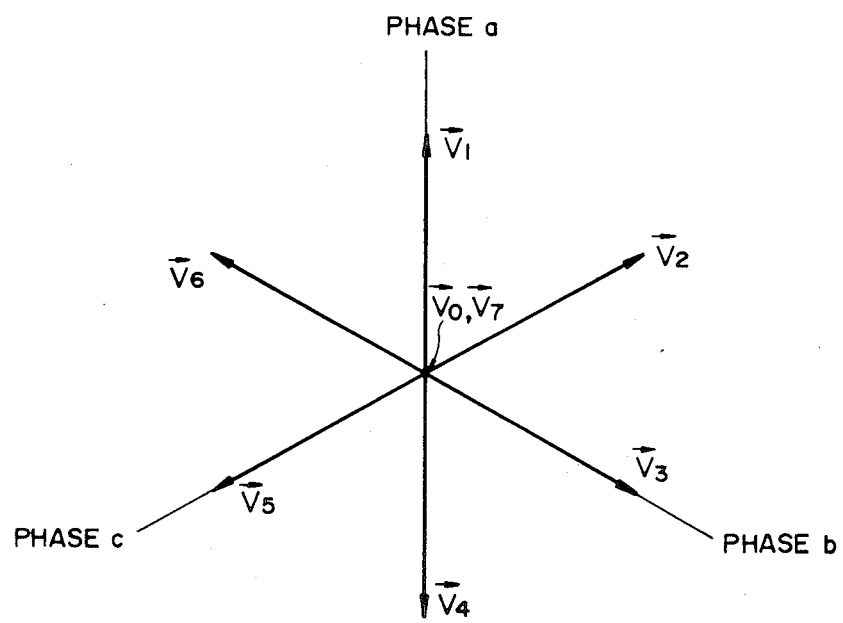
FIG. 3 is a chart showing voltage vectors.
Figure 4A:
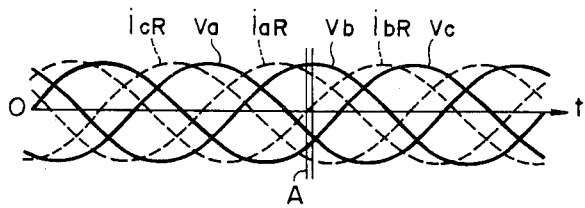
FIG. 4A is a chart showing the relationship between output current wave commands and ideal phase voltage waveforms.
Figure 4B:
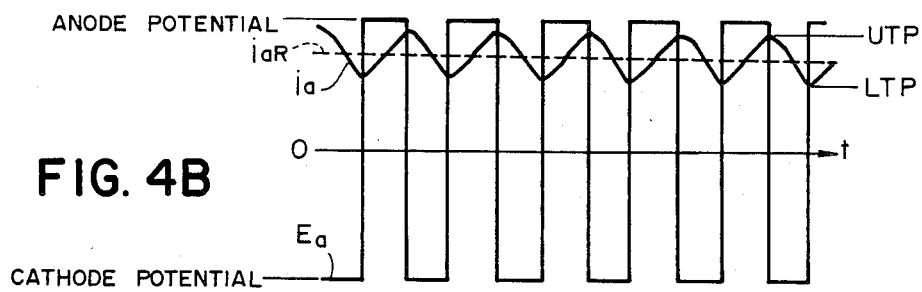
FIG. 4B to 4D are enlarged views of the part A of FIG. 4A.
Figure 4C:
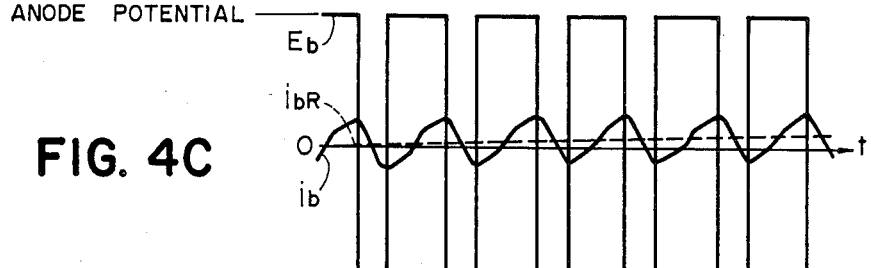
Figure 4D:
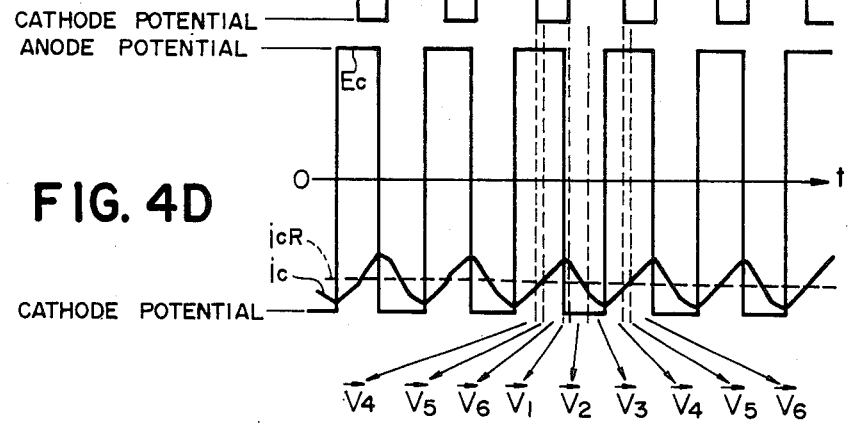
Figure 5:
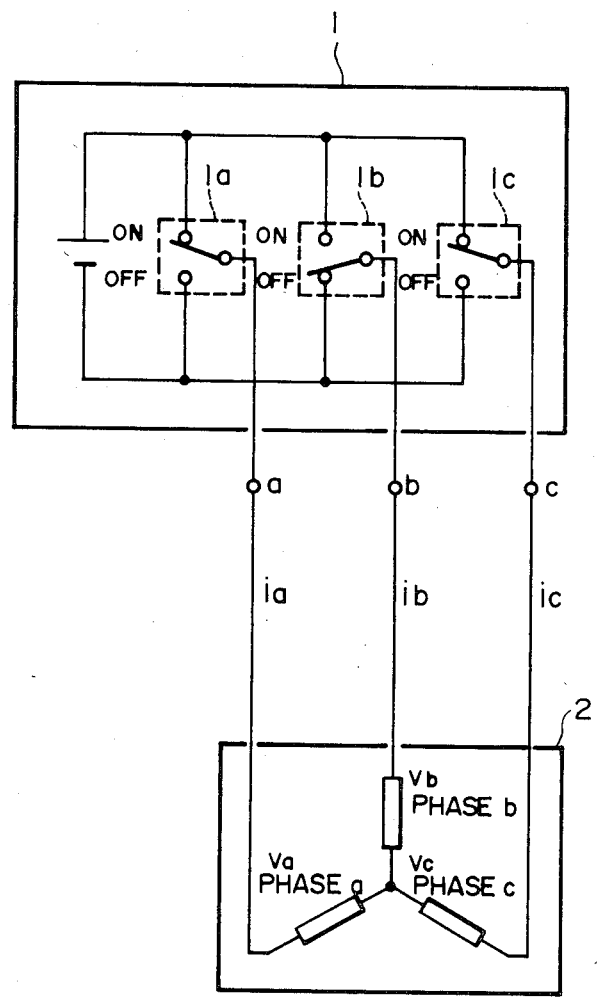
FIG. 5 is a circuit diagram for describing the method of controlling current of an inverter according to a first aspect of the invention.
Figure 15:
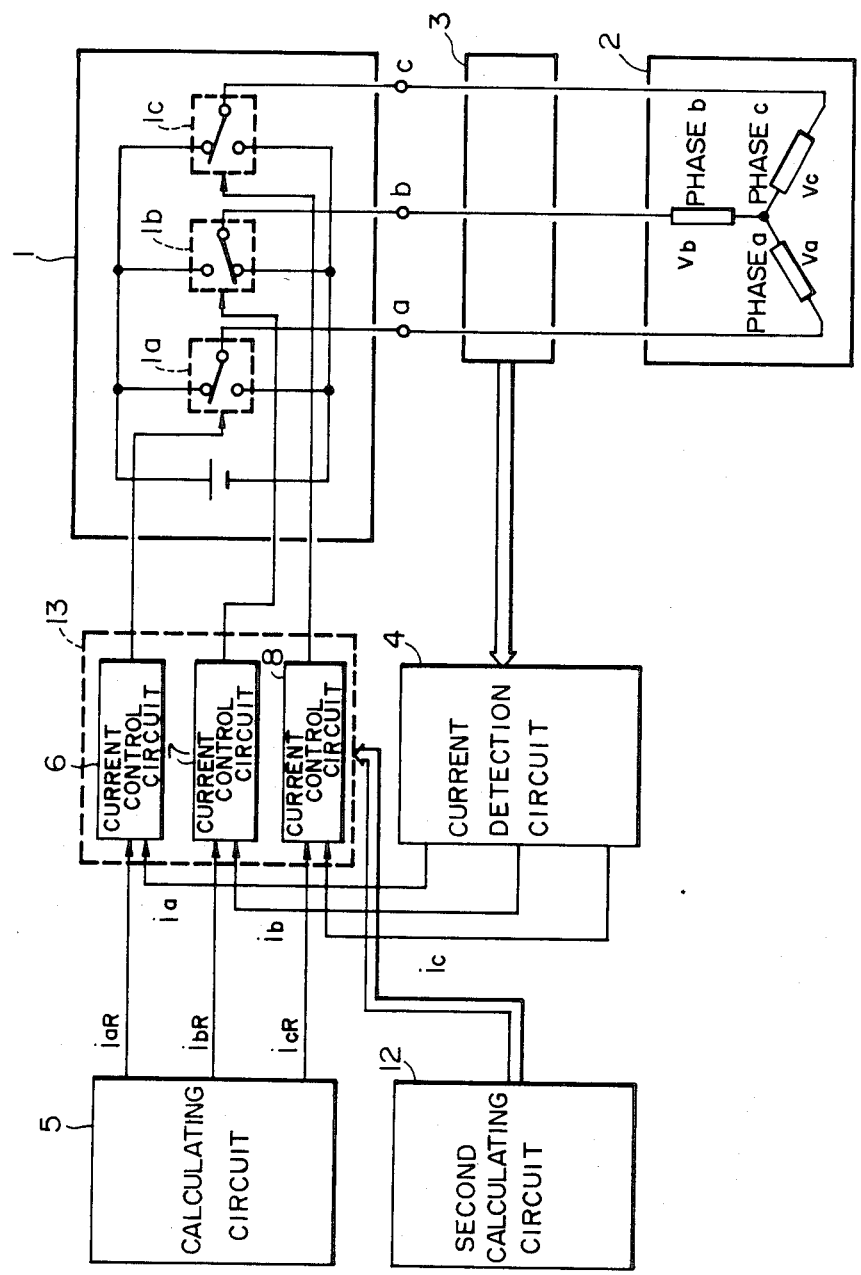
FIG. 15 is a block diagram showing a basic circuit of the inverter current controlling apparatus according to a second aspect of the invention.

FIG. 15 is a block diagram of a basic circuit of the inverter current controlling apparatus. It is to be noted that in FIG. 15 the parts corresponding to those in FIG. 1 are denoted by the same reference numerals, and the description thereof is omitted. This basic circuit differs from the conventional circuit in the provision of a second calculating circuit 12 for determination of a specific switching element to be maintained in a specific state, a state in which a specific switching element is maintained and a period of time during which a specific switching element is maintained in a specific state, in addition to the first calculating circuit 5 for calculating the output current command values $i_{aR}$, $i_{bR}$, $i_{cR}$. The second calculating circuit 12 is connected to a current control circuit 13 constituted by current controllers 6, 7, 8. The second calculating circuit 12 performs calculations for selecting a specific switching element to be maintained in a specific state, a specific state in which a specific switching element is maintained in a specific state, and a period of time during which a specific switching element is maintained in a specific state, on the basis of the magnitude and phase angle of each of the ideal phase voltages $v_a$, $v_b$, $v_c$ of the load 2 corresponding to the output current command values $i_{aR}$, $i_{bR}$, $i_{cR}$ in accordance with the above-described inverter current controlling method. On the other hand, the current control circuit 13 maintains a specific switching element in the ON or OFF state during a predetermined phase angle period in accordance with the results obtained by the second calculating circuit 12, as well as ON/OFF controls the other switching elements during the same period of time so that the instantaneous values of the output currents $i_a$, $i_b$, $i_c$ are substantially equal to the output current command values $i_{aR}$, $i_{bR}$, $i_{cR}$, respectively.

Figure 16:
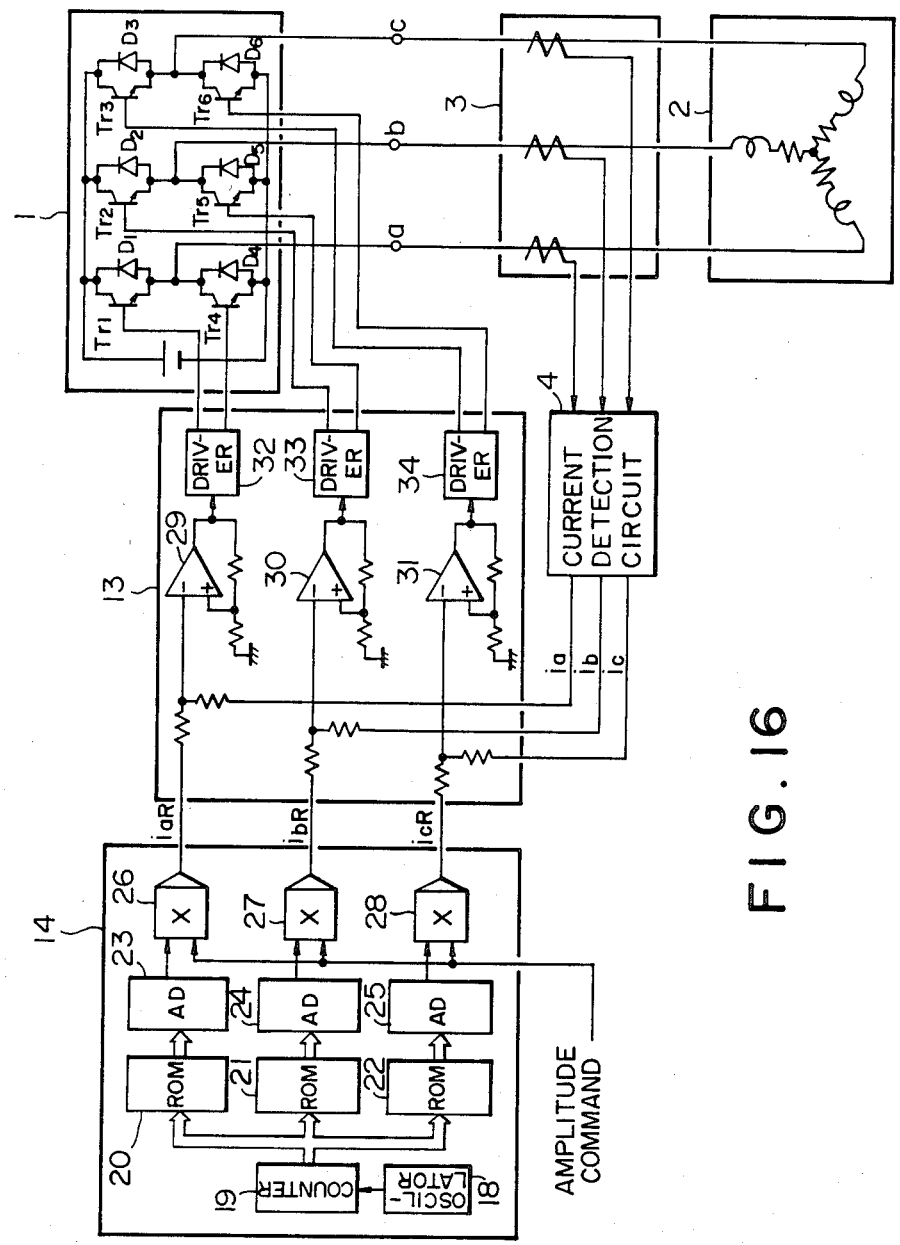
FIG. 16 is a circuit diagram of a first embodiment of the inverter current controlling apparatus of the invention.

A first embodiment of the inverter current controlling apparatus is shown in FIG. 16. In this embodiment, as a load is employed an three-phase load in which each phase is constituted by a reactor and a resistor and whose impedance is known, and the inverter is controlled in accordance with the first mode of the inverter current controlling method. It is to be noted that since the load has a constant power factor in this embodiment, the ideal phase voltages corresponding to the current command values can easily be conjectured from the output current command values.

The inverter 1 is composed of transistors $T_{r1}$ to $T_{r6}$ constituting switching elements, respectively, and diodes $D_1$ to $D_6$ parallel-connected to the transistors, respectively. The current detector 3 is adapted to detect current through each of wires connecting between the inverter 1 and the load 2. A calculating circuit 14 includes: an oscillator 18 which delivers a pulse signal of frequency proportional to the fundamental frequency of the inverter 1; a counter 19 which counts the pulse signal to calculate the phase $\theta_1$ of output current command value; read-only memories (ROM) 20, 21, 22 which are fed with the phase $\theta_1$ to deliver command values $i_{aR}$, $i_{bR}$, $i_{cR}$, respectively; analog-to-digital (AD) converters 23, 24, 25 which convert the command values $i_{aR}$, $i_{bR}$, $i_{cR}$ into analog signals, respectively; and multipliers 26, 27, 28 which multiply the command values and amplitude command values together to deliver the output current command values $i_{aR}$, $i_{bR}$, $i_{cR}$, respectively.

Figure 17A:
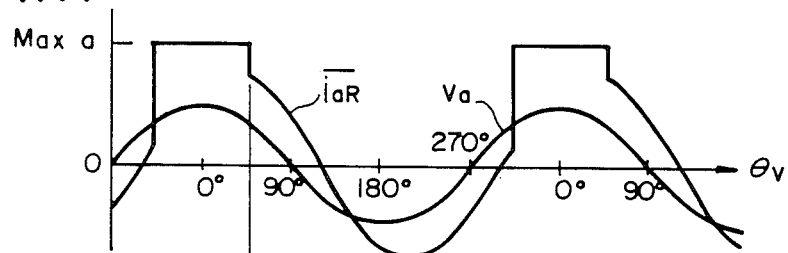
FIG. 17 is a chart showing maps stored in ROMs in the first embodiment.
Figure 17B:
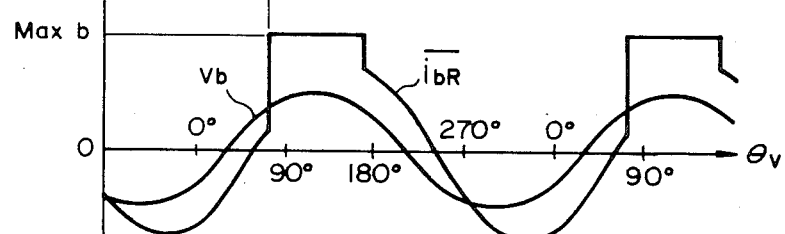
Figure 17C:
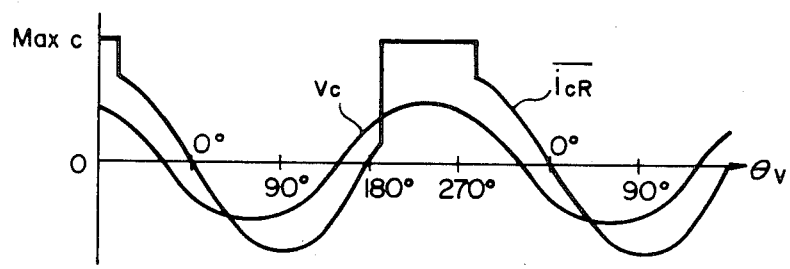

The ROMs 20, 21, 22 previously store therein the command values $i_{aR}$, $i_{bR}$, $i_{cR}$ in the form of maps as shown in FIGS. 17A, 17B, 17C, respectively. The command values $i_{aR}$, $i_{bR}$, $i_{cR}$ are constituted by sine curve portions and constant-amplitude portions which take maximum amplitudes Max a, Max b, Max c during the periods of time in which corresponding switching elements are maintained in specific states, respectively. The output current command values $i_{aR}$, $i_{bR}$, $i_{cR}$ can be obtained in the multipliers 26, 27, 28 by multiplying the command values $i_{aR}$, $i_{bR}$, $i_{cR}$ by amplitude command values, respectively.

In this case, the three-phase load has a constant impedance; therefore, representing the power factor angle of the three-phase load by $\theta_R$, the phase $\theta_v$ of ideal phase voltage corresponding to an output current command value is represented by the following equation:

$$\theta_v = \theta_i + \theta_R \qquad (2)$$

Accordingly, the phase $\theta_v$ of the ideal phase voltage can be obtained from the phase $\theta_i$ of the output current command value, and the current command value $i_a$, $i_b$ or $i_c$ takes a constant maximum value during a phase angle period in which a specific switching element is maintained in a specific state, by making the amplitude of the command value $i_{aR}$, $i_{bR}$ or $i_{cR}$ maximum positive during a phase angle period in which a specific switching element determined by the phase $\theta_v$ of tne ideal phase voltage is maintained in a specific state. In addition, the sine curve portion of each command value corresponds to an ordinary current command value. Thus, since each ROM previously stores therein the data on the sine curve portion and the constant-amplitude portion, it is possible to simultaneously deliver data on an output current command value, a specific switching element to be maintained in a specific state, and a period during which a specific switching element is maintained in a specific state.

The current control circuit 13 has amplifiers 29, 30, 31 which have hysteresis and make comparison between the output current command values $i_{aR}$, $i_{bR}$, $i_{cR}$ and the instantaneous values of the output currents $i_a$, $i_b$, $i_c$ to deliver deviation signals, respectively. The current control circuit has drivers 32, 33, 34 for driving the above-mentioned transistors. The driver 32 is connected to the bases of the transistors $T_{r1}$, $T_{r4}$; the driver 33 is connected to the bases of the transistors $T_{r2}$, $T_{r5}$; and the driver 34 is connected to the bases of the transistors $T_{r3}$, $T_{r6}$.

The following is the description of the operation of this embodiment.

The current control circuit 13 ON/OFF controls the transistors $T_{r1}$ to $T_{r6}$ on the basis of the output current command values $i_{aR}$, $i_{bR}$, $i_{cR}$ and the output currents $i_a$, $i_b$, $i_c$ so that the instantaneous values of the output currents are substantially equal to the output current command values, respectively. In this case, when an output current command value becomes a maximum constant value, the deviation signal unconditionally takes a positive value; consequently, a specific switching element is fixed in a specific state. For example, when the command value $i_{aR}$ takes a maximum value $M_{axa}$, the output current command value $i_{aR}$ becomes maximum, and during this period of time the transistor $T_{r1}$ is ON, while the transistor $T_{r4}$ is OFF. Further, the other transistors $T_{r2}$, $T_{r3}$, $T_{r5}$, $T_{r6}$ are ON/OFF controlled so that the instantaneous values of the output currents are substantially equal to the output current command values, respectively.

Thus, the current control can be effected with respect to the three-phase load with a constant impedance in accordance with the first mode simply by storing predetermined data in the ROMs. In this case, it is possible to improve the conversion efficiency and reduce the capacity of the inverter, since the output current waveforms are smoothed, and it is possible to decrease losses due to harmonic components and since it is possible to reduce the number of required switching operations of the inverter. In this embodiment, there is not any special increase in cost for carrying out the invention, since it is only necessary to rewrite the data stored in the ROMs.

It is to be noted that the second mode can be carried out with the same circuit configuration as that for the first mode if the data stored in the ROMs are rewritten so that the data take negative maximum values during the period of time in which the output terminal of a specific switching element is fixed to the cathode. Further, the third mode can be carried out with the same circuit configuration as that for the first mode if the data stored in the ROMs are rewritten so that data take positive maximum values during the period of time in which the output terminal of a specific switching element is fixed to the anode and so that the data take negative maximum values during the period of time in which the output terminal of a specific switching element is fixed to the cathode.

Figure 18:
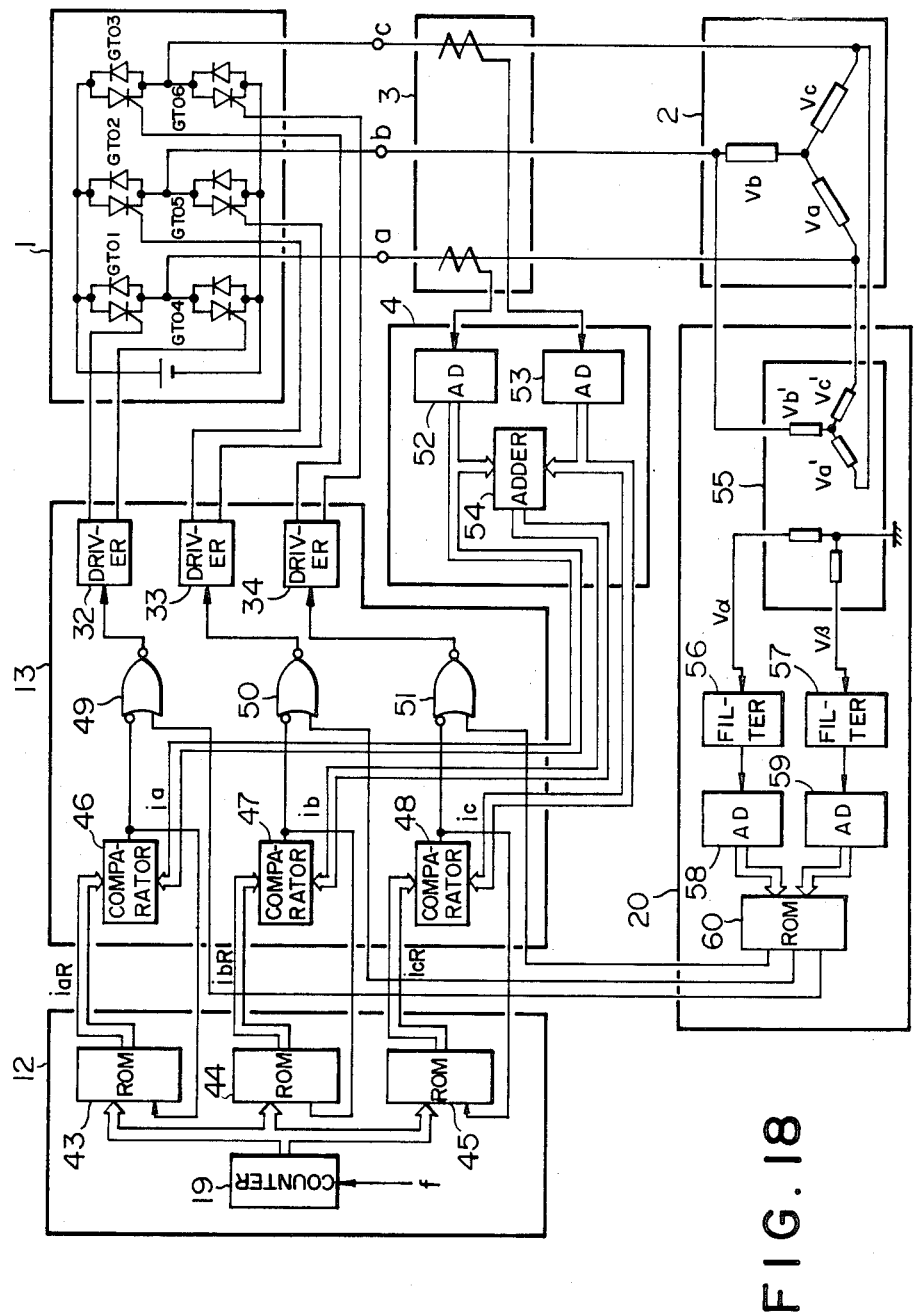
FIG. 18 is a circuit diagram of a second embodiment of the inverter current controlling apparatus of the invention.

FIG. 18 shows a second embodiment of the inverter current controlling apparatus of the invention. It is to be noted that in FIG. 18 the parts corresponding to those in FIG. 16 are denoted by the same reference numerals.

In this embodiment, as the load is employed an three-phase load whose impedance is not known, and the inverter is controlled in accordance with the second mode.

The inverter 1 is composed of gate turn-off thyristors $GTO_1$ to $GTO_6$ constituting switching elements, respectively. The current detector 3 is adapted to detect the instantaneous values of the output currents flowing though any two of wires connecting between the inverter 1 and the load 2. The current detection circuit 4 is composed of analog-to-digital (AD) converters 52, 53 connected to detection sections in the current detector 3, respectively, and an adder circuit 54 which calculates the instantaneous value of the output current flowing through the wire not detected, through the above-mentioned equation (1).

A second calculating circuit 20 is adapted to determine a specific switching element for fixing a specific output terminal of the inverter to the cathode and a period of time during which a specific switching element is maintained in a specific state, by detecting an ideal phase voltage from an actual phase voltage applied to the three-phase load 2 with a variable impedance. The second calculating circuit 20 is composed of a Scott-connected transformer 55, filters 56, 57, AD converters 58, 59, and an ROM 60. Three-phase voltages $v_a$, $v_b$, $v_c$ of the load are converted into orthognal two-phase voltages $v_\alpha$, $v_\beta$ by means of the transformer 55 and passed through the filters 56, 57 to remove harmonic components and are then converted into digital signals by means of the AD converters 58, 59 before being fed into the ROM 60. The ROM 60 previously stores therein data on the switching element maintaining period corresponding to the phase $\theta_v$ of the two-phase voltages $v_\alpha$, $v_\beta$, that is, the ideal phase voltage, and data on a specific switching element for fixing a specific output terminal to the cathode, that is, data for delivering a high-level signal during the period of time in which a specific switching element is maintained in a specific state. The ROM 60 delivers these data in accordance with the digital signals representative of the two-phase voltages.

The first calculating circuit 12 includes a counter 19 which counts a fundamental frequency f to deliver the phase $\theta_i$ of the output current command value, and ROMs 43, 44, 45 storing therein the output current command values $i_{aR}$, $i_{bR}$, $i_{cR}$ corresponding to the output current command value phase $\theta_i$.

The current control circuit 13 is composed of comparators 46, 47, 48 for making comparison between the output current command values $i_{aR}$, $i_{bR}$, $i_{cR}$ delivered from the ROM 43, 44, 45, respectively, and the instantaneous values of the output currents $i_a$, $i_b$, $i_c$ delivered from the current detection circuit 4, logic circuits 49, 50, 51 fed with output signals from the comparators 46, 47, 48 and output signals from the ROM 60, respectively, and the drivers 32, 33, 34. It is to be noted that the output signals from the comparators 46, 47, 48 are fed back to the ROMs 43, 44, 45 in order to give hysteresis to the output current command values.

The operation of this embodiment will be explained hereinunder.

It is possible to put the output terminals of the logic circuits 49, 50, 51 at the low level by putting one input terminals of the logic circuits 49, 50, 51 at the high level by means of the output signals from the ROM 60, respectively. In other words, it is possible to neglect the signals delivered from the comparators 46, 47, 48, respectively. The drivers 32, 33, 34 ON/OFF control the gate turn-off thyristors GTO$_1$ to GTO$_6$ in response to the output signals from the logic circuits 49, 50, 51, respectively. For example, when the output signal from the logic circuit 49 is low level, the driver 32 controls the gate turn-off thyristor GTO$_1$ to be OFF and the gate turn-off thyristor GTO$_4$ to be ON. As a result, the output terminal a of the inverter is fixed to the cathode. During this period of time, the gate turn-off thyristors GTO$_2$, GTO$_3$, GTO$_5$, GTO$_6$ are ON/OFF controlled so that the instantaneous values of the output currents $i_a$, $i_b$, $i_c$ are substantially equal to the output current command values $i_{aR}$, $i_{bR}$, $i_{cR}$, respectively.

As described above, this embodiment makes it possible to effect current control with respect to all loads, provided that the inverter is of current-controlled type. In this case, similar to the first embodiment, the output currents have waveforms with reduced harmonic componenets, and the inverter is improved in characteristics.

In addition, since this embodiment is carried out in accordance with the second mode, it is only necessary to arrange such as to detect from the three-phase voltages only an ideal phase voltage showing a negative maximum value in the ideal phase voltages. For this reason, it is not necessary to detect the amplitude of the ideal phase voltage in the second calculating circuit 20, and the arrangement for the detection can be constituted by a simple phase detection circuit. For example, it is also possible to detect the phase of the ideal phase voltage simply by passing the phase voltages through filters and making comparison between the phase voltages so as to detect a negative maximum phase voltage in the phase voltages. From this point view, when the load has a variable impedance, that is, when it is necessary to detect the phase angle of the ideal phase voltage, it is effective, for simplifying the detection of the phase angle of the ideal phase voltage, to apply the first or second mode which can be carried out simply by detecting a positive maximum phase voltage or a negative maximum phase voltage. It is to be noted that in this embodiment the current control circuit is constituted by a digital circuit; therefore, there is no possibility of production of any drift due to an analog circuit. In addition, since the function to fix the output terminal potential is realized by employing a digital signal, the means therefor can easily be constituted by logic circuits. Further, the first and second modes can easily be carried out simply by changing the logic circuits 49, 50, 51 and the data stored in the ROM 60.

Figure 19:
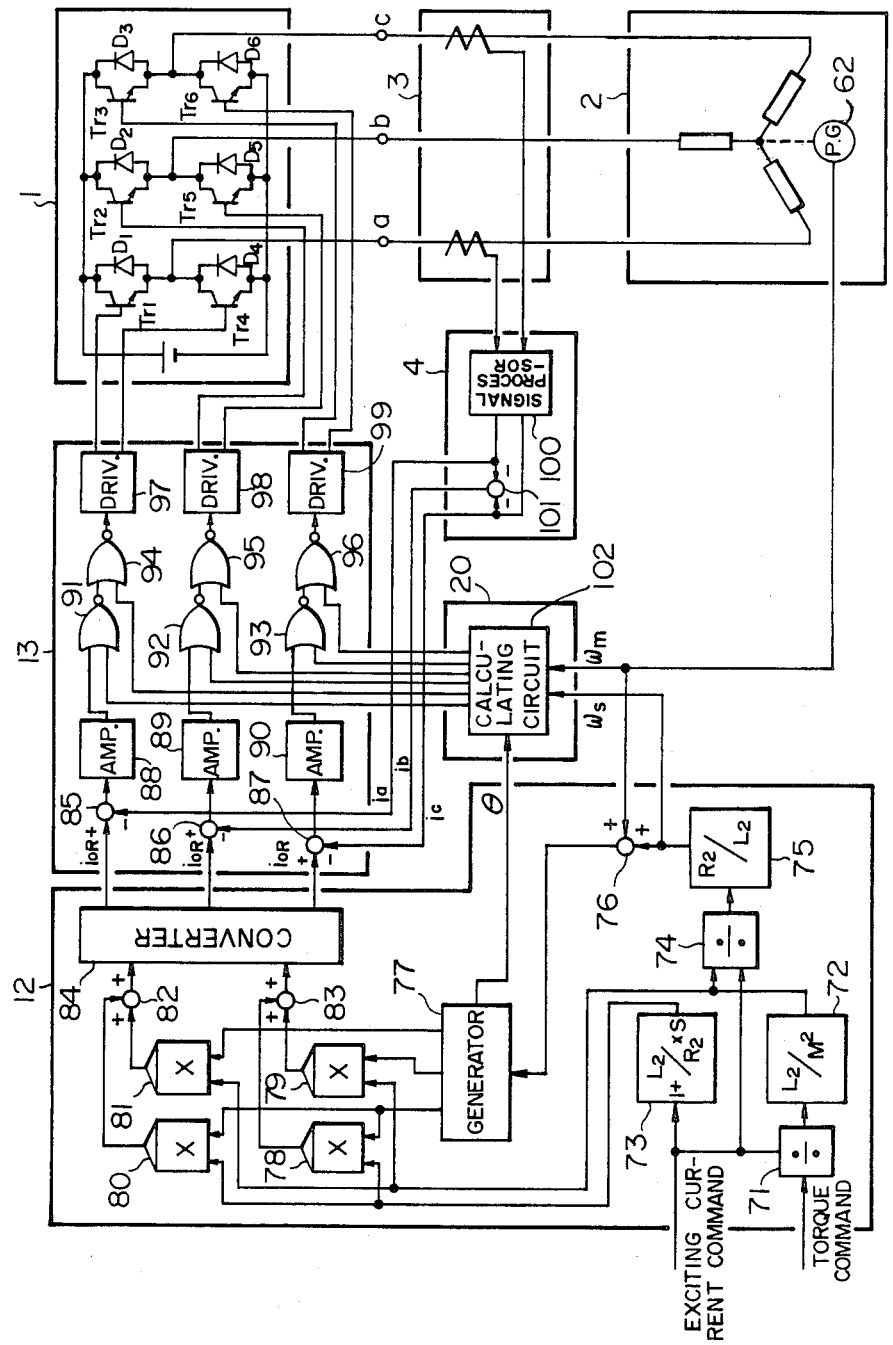
FIG. 19 is a circuit diagram of a third embodiment of the inverter current controlling apparatus of the invention.

FIG. 19 shows a third embodiment of the inverter current controlling apparatus according to the second aspect of the invention. In this embodiment, a three-phase induction motor is employed as the load, and the third mode is applied.

The inverter 1 is composed of transistors similarly to the first embodiment, while the current detector 2 is adapted to detect output currents flowing through any two of the wires connecting between the inverter 1 and the load 2 similarly to the second embodiment. The load 2 is constituted by a three-phase induction motor, which is connected with a pulse generator 62 for detecting a rotational angle frequency $\omega_m$ of the motor.

The current detection circuit 4 has a signal processor 100 which converts the instantaneous values of the output currents $i_a$, $i_b$, $i_c$ delivered from the current detector 3 into signal levels suitable for processing in the current control circuit, and an adder 101 which calculates the instantaneous value of the other output current, which is not detected, through the above-mentioned equation (1).

The first calculating circuit 12 is constituted by a vector control circuit which is fed with a torque command, an exciting current command and the rotational angle frequency $\omega_m$ detected by the pulse generator 62 to effect operational processing by means of the vector control method, thereby to deliver the output current command values $i_{aR}$, $i_{bR}$, $i_{cR}$. The prior vector control circuit is composed of dividers 71, 74, an amplifier 72 with an amplification factor of $L_2/M^2$, an operational amplifier 73 with a transfer function of $1+(L_2/R_2)\cdot S$, an amplifier 75 with an amplification factor of $R_2/L_2$, a three-phase sine wave generator 77, adders 76, 82, 83, multipliers 78, 79, 80, 81 and a two-to-three phase converter 84, wherein: $L_2$ represents the secondary winding self-inductance of the induction motor; M the mutual inductance between the primary and secondary windings; $R_2$ the secondary winding resistance; and S slip. According to this vector control circuit, the output current command values $i_{aR}$, $i_{bR}$, $i_{cR}$ are delivered from the two-to-three phase converter 84, and a slip angle frequency $\omega_s$ is delivered from the operational amplifier 75. In addition, the phase $\theta$ of the exciting current is delivered from the two-phase sine wave generator 77.

Figure 20:
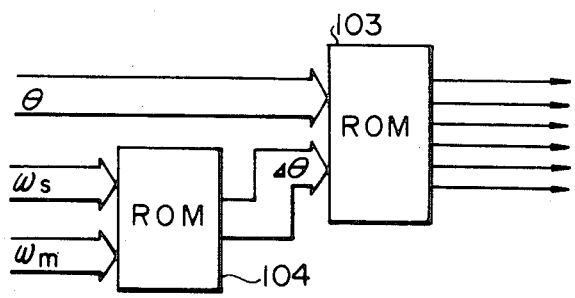
FIG. 20 is a block diagram showing a second calculating circuit in the third embodiment.

A second calculating circuit 20 is fed with the rotational angle frequency $\omega_m$, the slip angle frequency $\omega_s$ and the exciting current phase $\theta$ to calculate the ideal phase voltage phase $\theta_v$ of the load, and is constituted by a calculating circuit 102 for determining a specific switching element for fixing a specific inverter output terminal to a specific polarity, a specific polarity in which a specific switching element is maintained and a period during which a specific switching element is maintained in a specific state in accordance with the third mode. An example of the calculating circuit 102 is shown in FIG. 20. The calculating circuit 102 is composed of ROMs 103 and 104. In the ROM 104, a phase difference $\Delta\theta$ between the phase voltage and the exciting current corresponding to the slip angle frequency $\omega_s$ and the rotational angle frequency $\omega_m$ is previously written for each of operating points. In the ROM 103, on the other hand, control data (on a specific switching element to be fixed, a polarity to which a specific switching element is fixed, and a period during which a specific switching element is maintained in a spacific state) are previously written with respect to the ideal phase voltage phase $\theta_v$ represented by the sum of the exciting current phase $\theta$ and tne phase difference $\Delta\theta$.

The current control circuit 13 includes comparators 85, 86, 87 which make comparison between the output current command values $i_{aR}$, $i_{bR}$, $i_{cR}$ and the instantaneous values of the output currents $i_a$, $i_b$, $i_c$ to deliver deviation signals, respectively, amplifiers 88, 89, 90 for amplifying the deviation signals, respectively, NOR circuits 91 to 96, and drivers 97, 98, 99. One input terminals of the NOR circuits 91 to 96 are connected to respective output terminals of the calculating circuit 102. It is to be noted that the comparators 85, 86, 87 and the amplifiers 88, 89, 90 can be replaced by known current control circuits.

The operation of this embodiment will be explained hereinunder.

The ROM 104 delivers a phase difference $\Delta\theta$ corresponding to the slip angle frequency $\omega_s$ and the rotational angle frequency $\omega_m$, while the ROM 103 delivers a control signal corresponding to the exciting current phase θ and the phase difference Δθ, that is, a control signal corresponding to the phase angle $\theta_v$ of the ideal phase voltage. This control signal serves to maintain a specific switching element in the ON or OFF state during the period of a phase angle of 60°. For example, by making one inputs of the NOR circuits 94, 95, 96 high level, it is possible to fix a specific output terminal of the inverter to the cathode while neglecting the output potential data from the amplifiers 88, 89, 90. Further, a specific output terminal of the inverter can be fixed to the anode by making one inputs of the NOR circuits 94, 95, 96 low level and making one inputs of the NOR circuits 91, 92, 93 high level. While a specific output terminal of the inverter is maintained at a specific polarity, the other output terminals are changed in polarity by the ON/OFF control effected by the other switching elements (transistors) so that the instantaneous values of the output currents are approximated to the output current command values, respectively.

According to the third embodiment, similarly to the first and second embodiments, the currents flowing through the induction motor are smoothed. Therefore, it is possible to reduce the iron and copper losses due to harmonic components and also the number of required switching operations of the inverter, so that the switching loss is decreased and the inverter is improved in efficiency. It is to be noted that since it is necessary to detect the state of the load in order to effect a highly accurate control at high speed as in the case of the vector control method, the quantity of each state of the load is constantly detected and the state of the load is calculated in the control section. In order to apply the invention to such a control, it is necessary to detect the voltage phase from the load state, and the above-mentioned arrangement is sufficient for this need. In general, since the voltage phase is detected in the control section, there is not any special increase in cost for application of the invention. Further, in this embodiment, the current control is effected through the recognition of the voltage phase and in accordance with the third mode; therefore, a specific output terminal to be fixed and a polarity to which a specific output terminal is fixed are finely controlled and only optimum voltage vectors are selected at all times. Moreover, there is no need for provision of any deadband, since optimum voltage vectors are selected even if errors on the order of +30° are included.

In this embodiment, the first and second modes can be carried out simply by changing the data stored in the calculating circuit 20. In addition, the inverter current controlling method according to the first aspect of the invention can easily be applied to current-controlled inverters, employed in various fields, which are provided with vector control devices and the like having other circuit configurations, simply by adding means for calculating or detecting the voltage phase and means for fixing a specific output terminal to a specific polarity.

Although the invention has been described through the embodiments employing the Y-connected three-phase load as the load, it is to be noted here that the described embodiments are not exclusive and the invention is also applicable to delta-connected three-phase load, and various changes and modifications may be imparted thereto without departing from the scope of the invention which is limited solely by the appended claims.

What is claimed is:

1. A method of controlling current of an inverter having a plurality of switching elements which are selectively connected to an anode and a cathode of a DC power source through an ON/OFF control in which output currents of the inverter connected to a three-phase load are detected, and control is effected so that instantaneous values of the output currents are substantially equal to set output current command values, respectively, comprising the steps of:
    (a) providing a phase voltage defined as an ideal phase voltage between an input terminal of each phase load of the three-phase load and a neutral point wherein each ideal phase voltage is represented by a phase voltage obtained when currents of predetermined output wave commands are allowed to flow through said three-phase load, respectively;
    (b) selecting a specific ideal phase voltage having a maximum absolute value of said ideal phase voltages;
    (c) maintaining a specific one of said switching elements associated with a load phase having said specific ideal phase voltage in either one of an ON or OFF state during a period of time when a phase angle of said specific ideal phase voltage is within a predetermined phase angle range;
    (d) detecting output currents of said inverter; and
    (e) ON/OFF controlling the two switching elements other than said specific switching element a plurality of times during the period of said time when the phase angle of ideal phase voltage is within said predetermined phase angle range so that said output current waveforms are substantially equal to respective output current wave commands.

2. A method of controlling current of an inverter according to claim 1, wherein in the step (b) an ideal phase voltage showing a positive maximum value is selected from said ideal phase voltages, and in the step (c) a specific switching element corresponding to a load phase having said ideal phase voltage showing said positive maximum value is maintained in the ON state during a period of time when the phase angle of said ideal phase voltage showing said positive maximum value is within an angle not exceeding 120°.

3. A method of controlling current of an inverter according to claim 2, wherein said specific switching element is maintained in the ON state so as to be connected to the anode of said DC power source.

4. A method of controlling current of an inverter according to claim 1, wherein in the step (b) an ideal phase voltage showing a negative maximum value is selected from said ideal phase voltages, and in the step (c) a specific switching element corresponding to a load phase having said ideal phase voltage showing said negative maximum value is maintained in the OFF state during a period of time when the phase angle of said ideal phase voltage showing said negative maximum value is within an angle not exceeding 120°.

5. A method of controlling current of an inverter according to claim 4, wherein said specific switching element is maintained in the OFF state so as to be connected to the cathode of said DC power source.

6. A method of controlling current of an inverter according to claim 1, wherein in the step (b) an ideal phase voltage showing a positive maximum value is selected from said ideal phase voltages, and in the step (c) a specific switching element corresponding to a load phase having said ideal phase voltage showing said positive maximum value is maintained in the ON state during a period of time when the phase angle of said ideal phase voltage showing said positive maximum value is within an angle not exceeding 60°, and wherein in the step (b) an ideal phase voltage showing a negative maximum value is selected from said ideal phase voltages, and in the step (c) a specific switching element corresponding to a load phase having said ideal phase voltage showing said negative maximum value is maintained in the OFF state during a period of time when the phase angle of said ideal phase voltage showing said negative maximum value is within an angle not exceeding 60°.

7. A method of controlling current of an inverter according to claim 1, wherein said ideal phase voltage whose phase angle is within said predetermined phase angle range, includes a maximum point of amplitude of said ideal phase voltage within said predetermined phase angle range.

8. A method of controlling current of an inverter according to claim 6, wherein said specific switching element corresponding to the load phase having said ideal phase voltage showing said positive maximum value is maintained in the ON state so as to be connected to the anode of said DC power source, and said specific switching element corresponding to the load phase having said ideal phase voltage showing said negative maximum value is maintained in the OFF state so as to be connected to the cathode of said DC power source.

9. A method of controlling current of an inverter according to claim 7, wherein said specific switching element corresponding to the load phase having said ideal phase voltage showing said positive maximum value is maintained in the ON state so as to be connected to the anode of said DC power source, and said specific switching element corresponding to the load phase having said ideal phase voltage showing said negative maximum value is maintained in the OFF state so as to be connected to the cathode of said DC power source.

10. A method of controlling current of an inverter according to claim 1, wherein in the step (e) at least one of the two switching elements other than said specific switching element is turned OFF when instantaneous values of said output current are more than an upper-limit value in a predetermined current range centering at a command value corresponding to said output current waveform, and at least one of the two switching elements other than said specific switching element is turned ON when the instantaneous value of said output current is less than a lower-limit value in said predetermined current range during the period of time when the phase angle of said ideal phase voltage is within said predetermined phase angle range.

11. A method of controlling current of an inverter according to claim 2, wherein in the step (e) at least one of the two switching elements other than said specific switching element is turned OFF when instantaneous values of said output current are more than an upper-limit value in a predetermined current range centering at a command value corresponding to said output current waveform, and at least one of the two switching elements other than said specific switching element is turned ON when the instantaneous value of said output current is less than a lower-limit value in said predetermined current range during the period of time when the phase angle of said ideal phase voltage is within said predetermined phase angle range.

12. A method of controlling current of an inverter according to claim 4, wherein in the step (e) at least one of the two switching elements other than said specific switching element is turned OFF when instantaneous values of said output current are more than an upper-limit value in a predetermined current range centering at a command value corresponding to said output current waveform, and at least one of the two switching elements other than said specific switching element is turned ON when the instantaneous value of said output current is less than a lower-limit value in said predetermined current range during the period of time when the phase angle of said ideal phase voltage is within said predetermined phase angle range.

13. A method of controlling current of an inverter according to claim 6, wherein in the step (e) at least one of the two switching elements other than said specific switching element is turned OFF when instantaneous values of said output current are more than an upper-limit value in a predetermined current range centering at a command value corresponding to said output current waveform, and at least one of the two switching elements other than said specific switching element is turned ON when the instantaneous value of said output current is less than a lower-limit value in said predetermined current range during the period of time when the phase angle of said ideal phase voltage is within said predetermined phase angle range.

14. An apparatus for controlling current of an inverter having a plurality of switching elements which are selectively connected to an anode and a cathode of a DC power source through ON/OFF control and are connected to a three-phase load corresponding to load phases thereof, comprising:
a current detection means for detecting an instantaneous value of an output current of said inverter;
a first calculating means for calculating a wave command whose amplitude takes a maximum constant value during a period of time when a phase angle of a phase voltage, obtained when current of an output current wave command shown by a sine curve is allowed to flow through said three-phase load, is within a predetermined phase angle range;
a second calculating means for calculating a difference between the instantaneous value of said output current and a command value corresponding to said wave command; and
a control means for turning ON said switching elements when said difference is more than an upper-limit value, and turning OFF said switching elements when said difference is less than a lower-limit value.

15. An apparatus for controlling current of an inverter according to claim 14, wherein said current detection means includes current detectors connected to two output terminals of said inverter, respectively, and a calculating circuit for calculating an instantaneous value of the output current at each of the output terminal of said inverter on the basis of the output signal of said current detector.

16. An apparatus for controlling current of an inverter having a plurality of switching elements which are selectively connected to an anode and a cathode of a DC power source through an ON/OFF control in which output currents of the inverter connected to a three-phase load are detected, and control is effected so that instantaneous values of the output currents are substantially equal to set output current command values, respectively, comprising:
- a current detection means for detecting an instantaneous value of an output current of said inverter;
- a first calculating means for calculating an output current command value corresponding to said output current;
- a second calculating means for selecting a specific switching element for fixing a specific output terminal of said inverter to a specific polarity in accordance with an ideal phase voltage between an input terminal of each phase load of the three-phase load and a neutral point wherein each ideal phase voltage is represented by a phase voltage obtained when currents of predetermined output current wave commands are allowed to flow through said three-phase load, respectively, and for calculating a phase angle range for fixing said specific switching element in either one of the ON or OFF state; and
- a current control means for fixing said selected specific switching element in either one of the ON or OFF state during the period of time when the phase angle of said ideal phase voltage is within said phase angle range, and for making comparison between the instantaneous value of said output current and said output current command value during the range of said phase angle to ON/OFF control the switching elements other than said specific switching element a plurality of times so that the instantaneous value of said output current is substantially equal to said output current command value.

17. An apparatus for controlling current of an inverter according to claim 16, further comprising a voltage detection means for detecting an actual phase voltage applied to said three-phase load, wherein said second calculating means calculates an ideal phase voltage between an input terminal of each phase of the three-phase load and a neutral point wherein each ideal phase voltage is represented by a phase voltage obtained when currents of predetermined output current wave commands are allowed to flow through said three-phase load, respectively from said actual phase voltage, and selects a specific switching element for fixing a specific output terminal of said inverter to a specific polarity in accordance with the calculated ideal phase voltage, as well as calculates a period of time when the phase angle of said ideal phase voltage is within said predetermined phase angle range for fixing said specific switching element in either one of the ON or OFF state.

18. An apparatus for controlling current of an inverter according to claim 16, wherein said three-phase load is an induction motor connected with a pulse generator for detecting a rotational angle frequency, and said second calculating means calculates an ideal phase voltage between an input terminal of each phase of the three-phase load and a neutral point wherein each ideal phase voltage is represented by a phase voltage obtained when currents of predetermined output current wave commands are allowed to flow through said three-phase load, respectively on the basis of said rotational angle frequency, slip angle frequency, and exciting current angle, and selects a specific switching element for fixing a specific output terminal of said inverter to a specific polarity in accordance with the calculated ideal phase voltage, as well as calculates period of time when the phase angle of said ideal phase voltage is within said predetermined phase angle range for fixing said specific switching element in either one of the ON or OFF state.

* * * * *